(12) United States Patent
Glickfield et al.

(10) Patent No.: US 9,600,465 B2
(45) Date of Patent: Mar. 21, 2017

(54) METHODS AND APPARATUSES FOR QUANTIFYING THE HOLISTIC VALUE OF AN EXISTING NETWORK OF DEVICES BY MEASURING THE COMPLEXITY OF A GENERATED GRAMMAR

(71) Applicant: QUALCOMM Incorporated, San Diego, CA (US)

(72) Inventors: Sarah Glickfield, Jerusalem (IL); Isaac David Guedalia, Bet Shemesh (IL)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/591,458

(22) Filed: Jan. 7, 2015

(65) Prior Publication Data

US 2015/0199330 A1 Jul. 16, 2015

Related U.S. Application Data

(60) Provisional application No. 61/926,162, filed on Jan. 10, 2014.

(51) Int. Cl.
*G10L 15/197* (2013.01)
*G06F 17/27* (2006.01)
(Continued)

(52) U.S. Cl.
CPC .............. *G06F 17/27* (2013.01); *G06F 9/54* (2013.01); *G06F 11/30* (2013.01);
(Continued)

(58) Field of Classification Search
CPC ......... H04W 74/0833; H04W 56/0045; H04W 56/0005
See application file for complete search history.

(56) References Cited

U.S. PATENT DOCUMENTS 7,356,462 B2 4/2008 Bangalore et al.
7,689,418 B2 3/2010 Ramaswamy et al.
(Continued)

OTHER PUBLICATIONS

Giura P., et al., "Is It Really You? User Identification Via Adaptive Behavior Fingerprinting," CODASPY '14 Proceedings of the 4th ACM conference on Data and application security and privacy, 2014, pp. 333-344.
(Continued)

*Primary Examiner* — David Hudspeth
*Assistant Examiner* — Shreyans Patel
(74) *Attorney, Agent, or Firm* — Muncy, Geissler, Olds & Lowe, P.C.

(57) ABSTRACT

Method and apparatuses for constructing a grammar to describe interactions among a plurality of devices in a network are disclosed. An aspect receives, by a network interface of a device, device capabilities of each of the plurality of devices, generates, by a reduced device list generator of the device, a reduced device list representing groupings of the plurality of devices based on the device capabilities, models, by an interaction sequence modeler of the device, one or more sequences of interactions among the plurality of devices using the reduced device list, constructs, by a grammar construction module of the device, the grammar based on the modeled one or more sequences of interactions, and stores the grammar in a memory of the device.

30 Claims, 17 Drawing Sheets

(51) Int. Cl.
    *G06F 9/54*         (2006.01)
    *G06F 11/30*      (2006.01)
    *H04W 4/00*      (2009.01)
    *H04L 29/06*      (2006.01)
    *G06N 99/00*     (2010.01)

(52) U.S. Cl.
    CPC ....... *H04L 29/06061* (2013.01); *H04W 4/005* (2013.01); *G06N 99/005* (2013.01)

(56) References Cited

U.S. PATENT DOCUMENTS

| | | |
|---|---|---|
| 8,145,474 B1 | 3/2012 | Daily et al. |
| 8,214,398 B1 | 7/2012 | Cowan et al. |
| 8,245,301 B2 | 8/2012 | Evans et al. |
| 8,442,812 B2 | 5/2013 | Ehsani et al. |
| 8,551,186 B1 | 10/2013 | Strand |
| 8,630,965 B2 | 1/2014 | Savvides et al. |
| 8,688,980 B2 | 4/2014 | Davis et al. |
| 8,972,325 B2 | 3/2015 | Varghese |
| 9,220,011 B1 | 12/2015 | Annan et al. |
| 2005/0097364 A1 | 5/2005 | Edeki et al. |
| 2007/0005990 A1* | 1/2007 | Sathish ............ H04L 67/14 713/189 |
| 2007/0113270 A1 | 5/2007 | Kraemer et al. |
| 2007/0180516 A1 | 8/2007 | Aoki et al. |
| 2007/0255818 A1 | 11/2007 | Tanzer et al. |
| 2008/0320539 A1* | 12/2008 | Ohkita ............ H04N 21/43615 725/118 |
| 2009/0292743 A1 | 11/2009 | Bigus et al. |
| 2009/0293121 A1 | 11/2009 | Bigus et al. |
| 2010/0228767 A1 | 9/2010 | Slinker et al. |
| 2013/0159550 A1 | 6/2013 | Vasseur |
| 2013/0173062 A1 | 7/2013 | Koenig-Richardson |
| 2013/0291099 A1 | 10/2013 | Donfried et al. |
| 2014/0123249 A1 | 5/2014 | Davis et al. |
| 2014/0195927 A1 | 7/2014 | Deweese et al. |
| 2015/0026181 A1 | 1/2015 | Milton et al. |
| 2015/0205958 A1 | 7/2015 | Turgeman et al. |
| 2016/0224652 A1 | 8/2016 | Schwartz |
| 2016/0300049 A1 | 10/2016 | Guedalia |

OTHER PUBLICATIONS

International Search Report and Written Opinion—PCT/US2015/010641—ISA/EPO—Mar. 31, 2015.

Jiang Y., et al., "Towards reengineering web sites to web-services providers", Software Maintenance and Reengineering, 2004. CSMR 2004. Proceedings. Eighth European Conference on Tampere, Finland Mar. 24-26, 2004, Piscataway, NJ, USA,IEEE, Mar. 24, 2004 (Mar. 24, 2004), pp. 296-305, XP010692157.

Ketabdar H., et al., "Motion and audio analysis in mobile devices for remote monitoring of physical activities and user authentication," Journal of Location Based Services, 2011, vol. 5 (3-4), pp. 182-200.

Manning C G N., et al., "Inferring lexical and grammatical structure from sequences", Compression and Complexity of Sequences 1997. Proceedings Salerno, Italy Jun. 11-13, 1997, Los Alamitos, CA, USA,IEEE Comput. Soc, US, Jun. 11, 1997 (Jun. 11, 1997), pp. 265-274, XP010274909, ISBN: 978-0-8186-8132-5.

Brech B., et al., "The Interconnecting of Everything," IBM Corporation, 2013, pp. 1-6.

Guo B., et al., "From the internet of things to embedded intelligence," 2012, pp. 1-29.

Lloret J., et al., "Ubiquitous Monitoring of Electrical Household Appliances," Sensors, 2012, vol. 12, pp. 15159-15191.

Schneider S., "Understanding the Protocols Behind the Internet of Things," Electronic Design, 2013, 8 pages.

* cited by examiner

METHODS AND APPARATUSES FOR QUANTIFYING THE HOLISTIC VALUE OF AN EXISTING NETWORK OF DEVICES BY MEASURING THE COMPLEXITY OF A GENERATED GRAMMAR

CROSS-REFERENCE TO RELATED APPLICATIONS

The present Application for Patent claims the benefit of U.S. Provisional Application No. 61/926,162, entitled "METHOD FOR QUANTIFYING THE HOLISTIC VALUE OF AN EXISTING NETWORK OF DEVICES BY MEASURING THE COMPLEXITY OF A GENERATED GRAMMAR," filed Jan. 10, 2014, assigned to the assignee hereof, and expressly incorporated herein by reference in its entirety.

TECHNICAL FIELD

The disclosure relates to quantifying the holistic value of an existing network of devices by measuring the complexity of a generated grammar.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments associated with the mechanisms disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

The disclosure is related to constructing a grammar to describe interactions among a plurality of devices in a network. A method for constructing a grammar to describe interactions among a plurality of devices in a network includes receiving, by a network interface of a device, device capabilities of each of the plurality of devices, generating, by a reduced device list generator of the device, a reduced device list representing groupings of the plurality of devices based on the device capabilities, modeling, by an interaction sequence modeler of the device, one or more sequences of interactions among the plurality of devices using the reduced device list, constructing, by a grammar construction module of the device, the grammar based on the modeled one or more sequences of interactions, and storing the grammar in a memory of the device.

An apparatus for constructing a grammar to describe interactions among a plurality of devices in a network includes a network interface configured to receive device capabilities of each of the plurality of devices, a reduced device list generator configured to generate a reduced device list representing groupings of the plurality of devices based on the device capabilities, an interaction sequence modeler configured to model one or more sequences of interactions among the plurality of devices using the reduced device list, a grammar construction module configured to construct the grammar based on the modeled one or more sequences of interactions, and a memory configured to store the grammar.

An apparatus for constructing a grammar to describe interactions among a plurality of devices in a network includes means for receiving, by a network interface of a device, device capabilities of each of the plurality of devices, means for generating, by a reduced device list generator of the device, a reduced device list representing groupings of the plurality of devices based on the device capabilities, means for modeling, by an interaction sequence modeler of the device, one or more sequences of interactions among the plurality of devices using the reduced device list, means for constructing, by a grammar construction module of the device, the grammar based on the modeled one or more sequences of interactions, and means for storing the grammar in a memory of the apparatus.

An apparatus for constructing a grammar to describe interactions among a plurality of devices in a network includes logic configured to receive, by a network interface of a device, device capabilities of each of the plurality of devices, logic configured to generate, by a reduced device list generator of the device, a reduced device list representing groupings of the plurality of devices based on the device capabilities, logic configured to model, by an interaction sequence modeler of the device, one or more sequences of interactions among the plurality of devices using the reduced device list, logic configured to construct, by a grammar construction module of the device, the grammar based on the modeled one or more sequences of interactions, and logic configured to store the grammar in a memory of the apparatus.

A non-transitory computer-readable medium for constructing a grammar to describe interactions among a plurality of devices in a network includes at least one instruction to receive, by a network interface of a device, device capabilities of each of the plurality of devices, at least one instruction to generate, by a reduced device list generator of the device, a reduced device list representing groupings of the plurality of devices based on the device capabilities, at least one instruction to model, by an interaction sequence modeler of the device, one or more sequences of interactions among the plurality of devices using the reduced device list, at least one instruction to construct, by a grammar construction module of the device, the grammar based on the modeled one or more sequences of interactions, and at least one instruction to store the grammar in a memory of the device.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
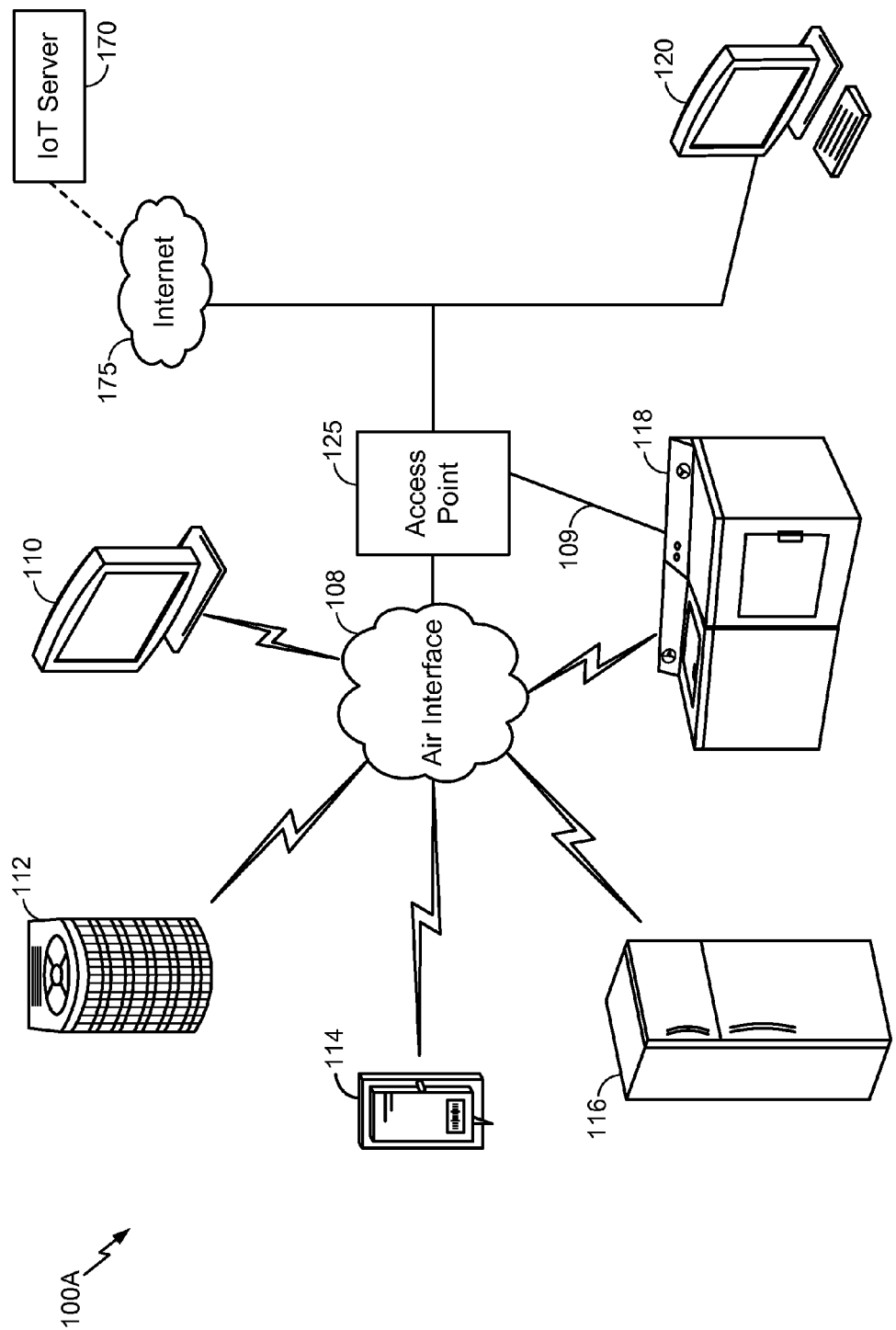
FIG. 1A illustrates a high-level system architecture of a wireless communications system in accordance with an aspect of the disclosure.

The disclosure is directed to constructing a grammar to describe interactions among a plurality of devices in a network. An aspect receives, by a network interface of a device, device capabilities of each of the plurality of devices, generates, by a reduced device list generator of the device, a reduced device list representing groupings of the plurality of devices based on the device capabilities, models, by an interaction sequence modeler of the device, one or more sequences of interactions among the plurality of devices using the reduced device list, constructs, by a grammar construction module of the device, the grammar based on the modeled one or more sequences of interactions, and stores the grammar in a memory of the device.

These and other aspects are disclosed in the following description and related drawings to show specific examples relating to exemplary embodiments of quantifying the holistic value of an existing network of devices by measuring the complexity of a generated grammar. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
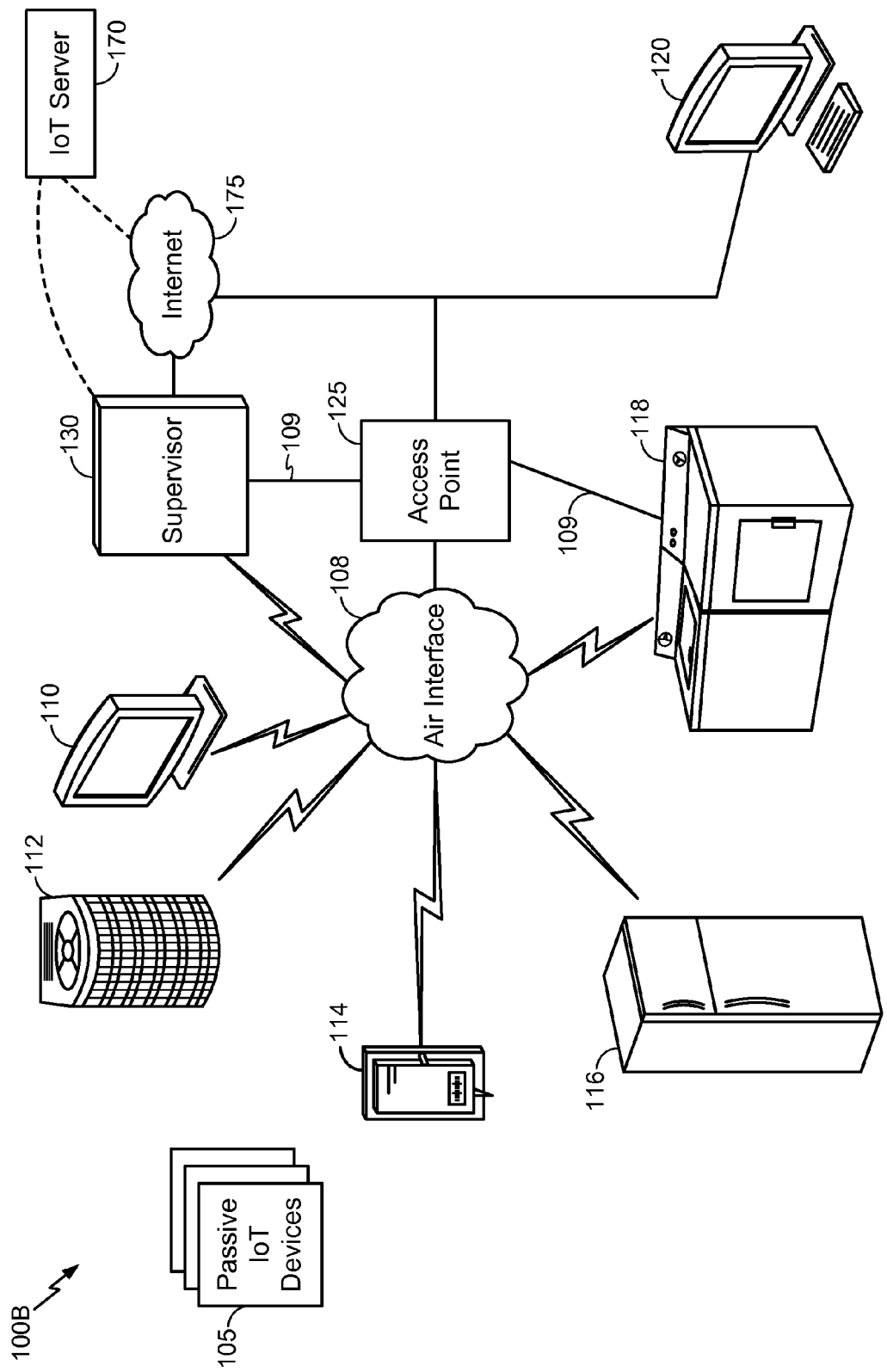
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
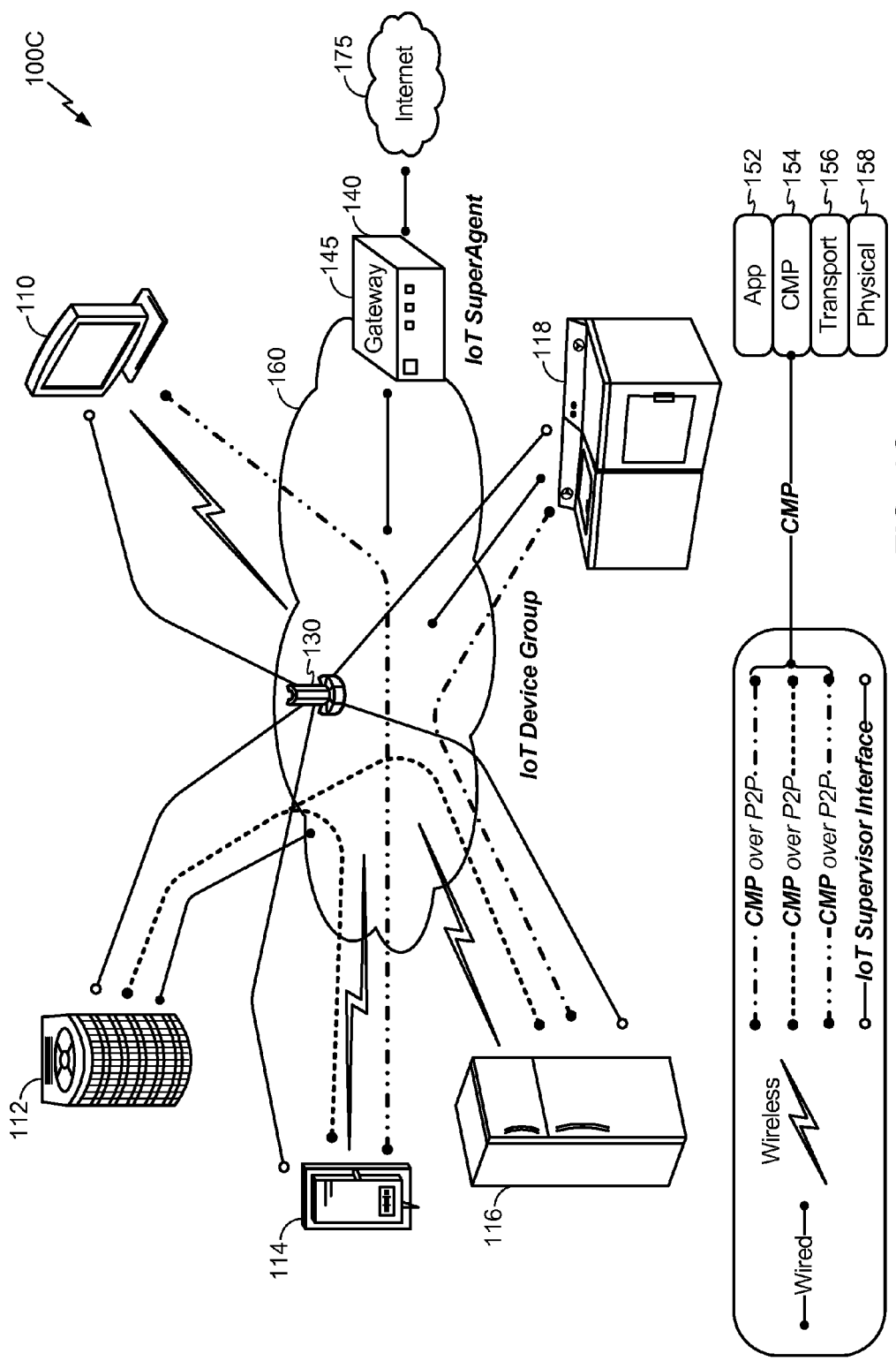
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
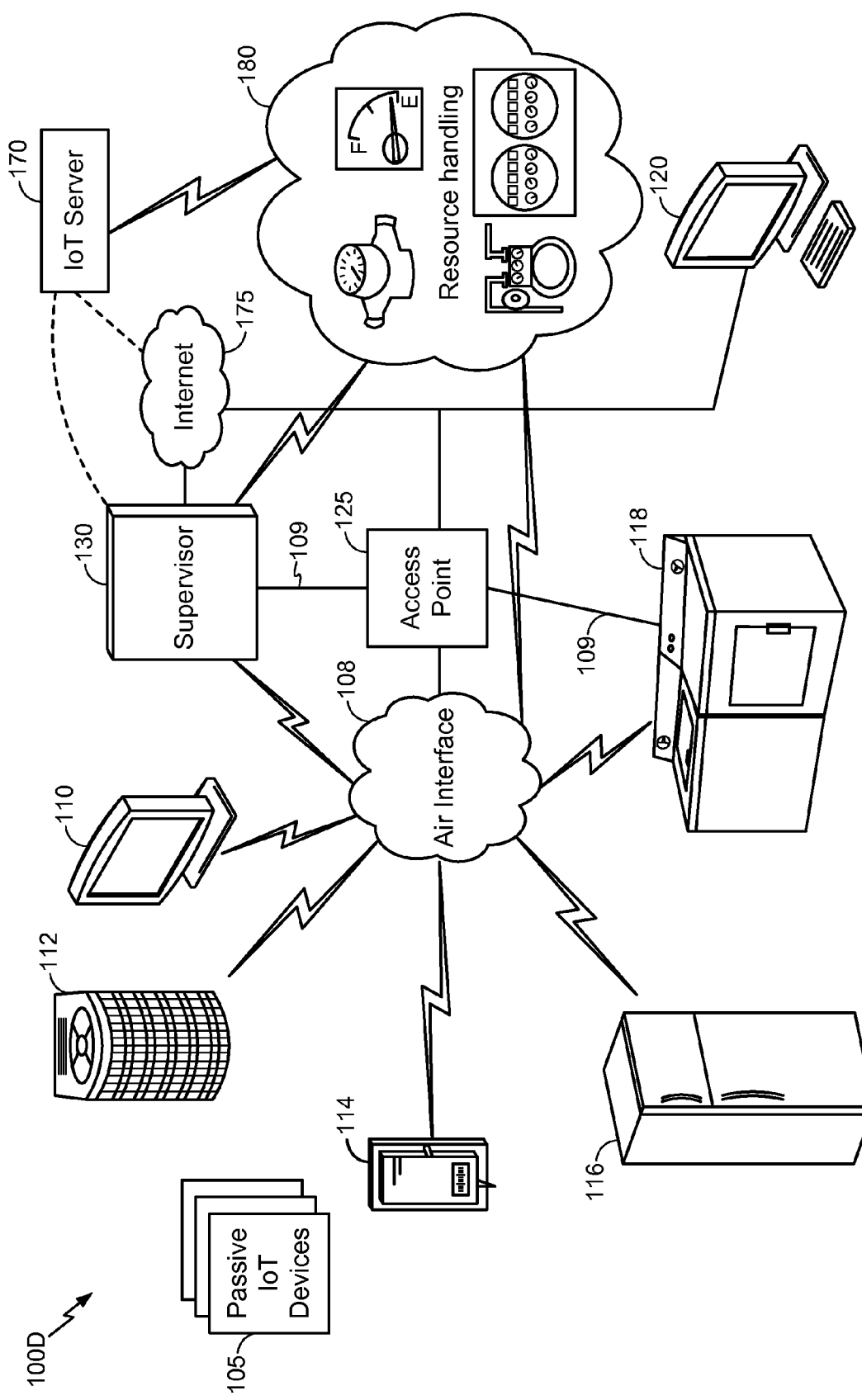
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
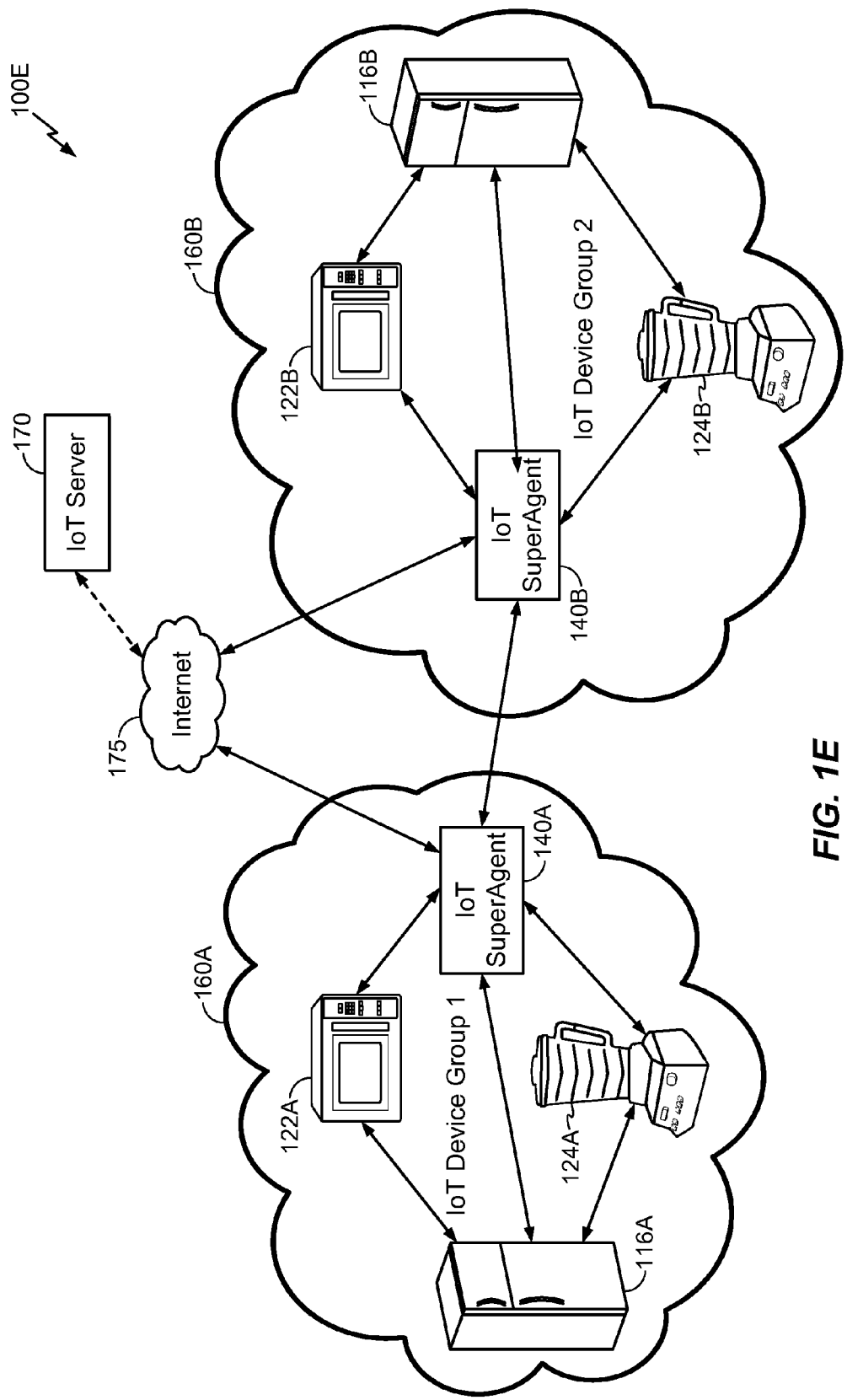
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
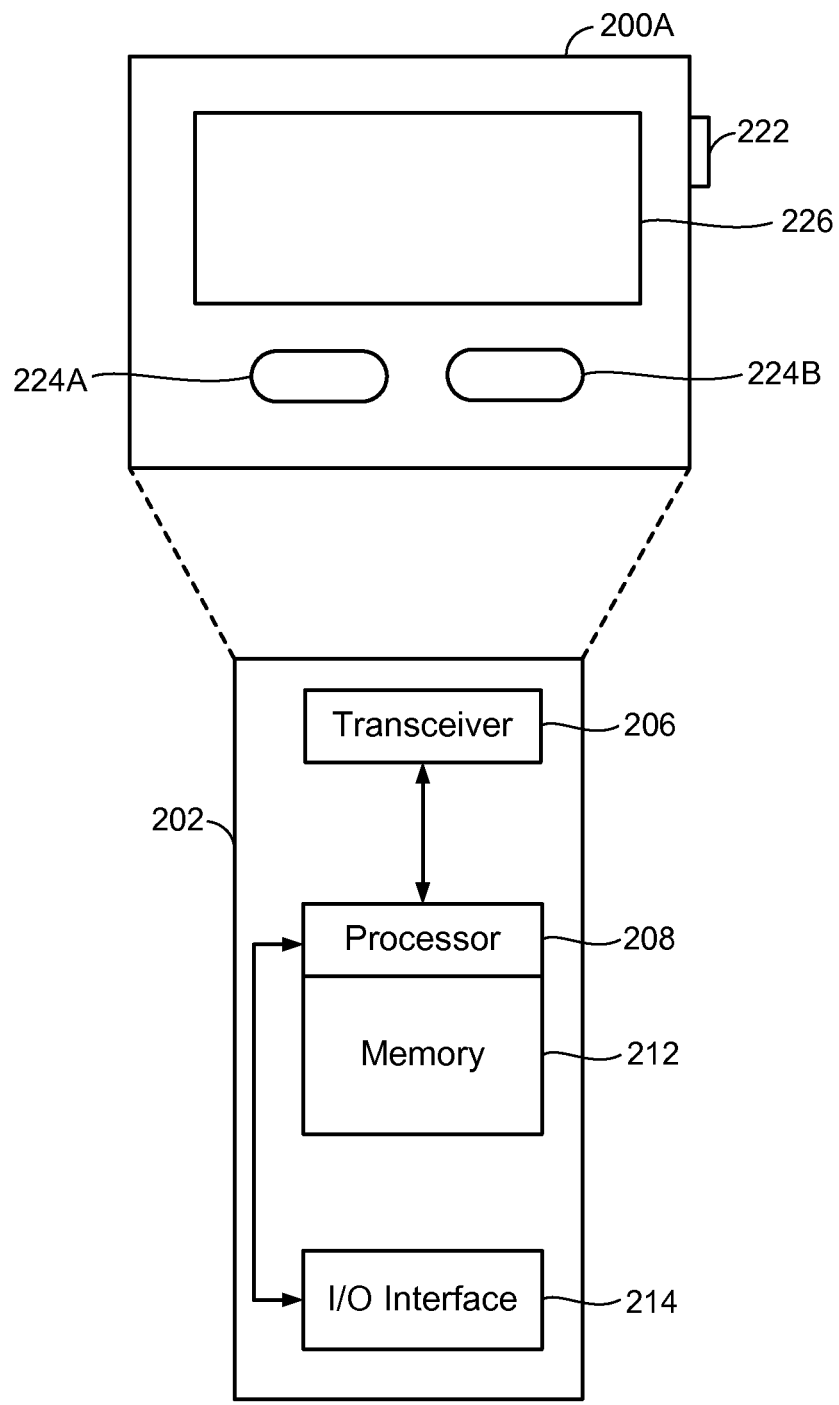

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
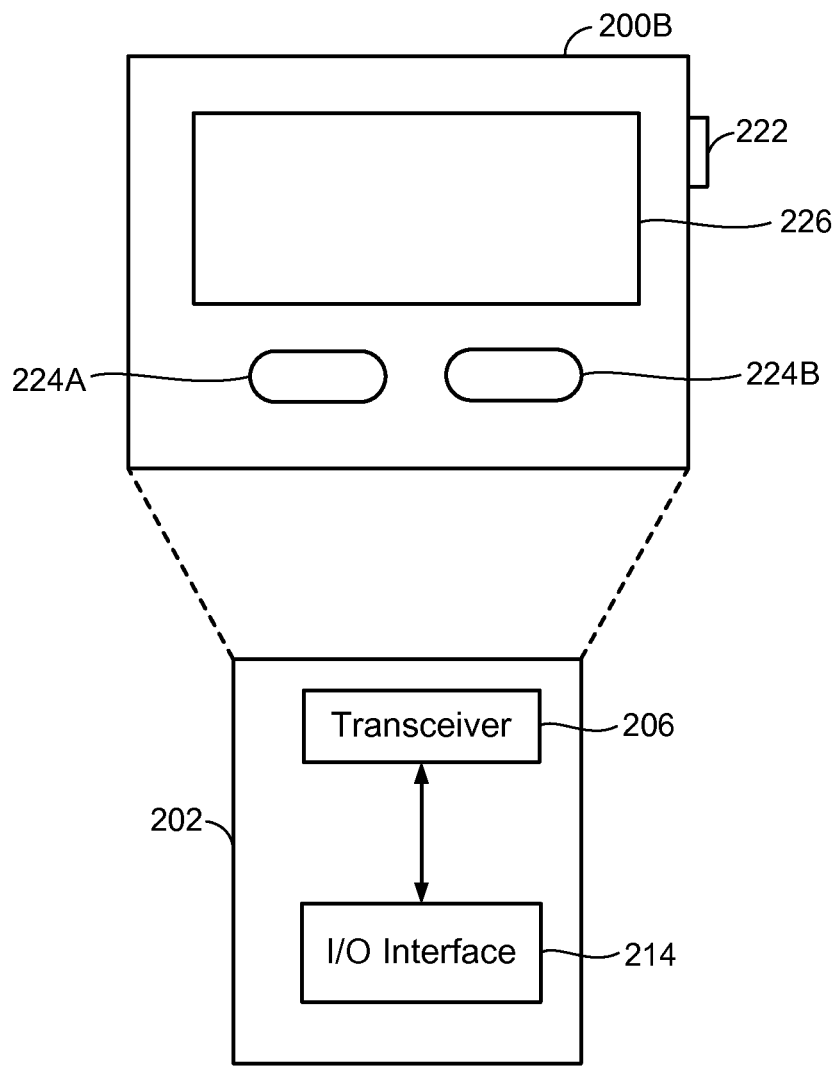
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
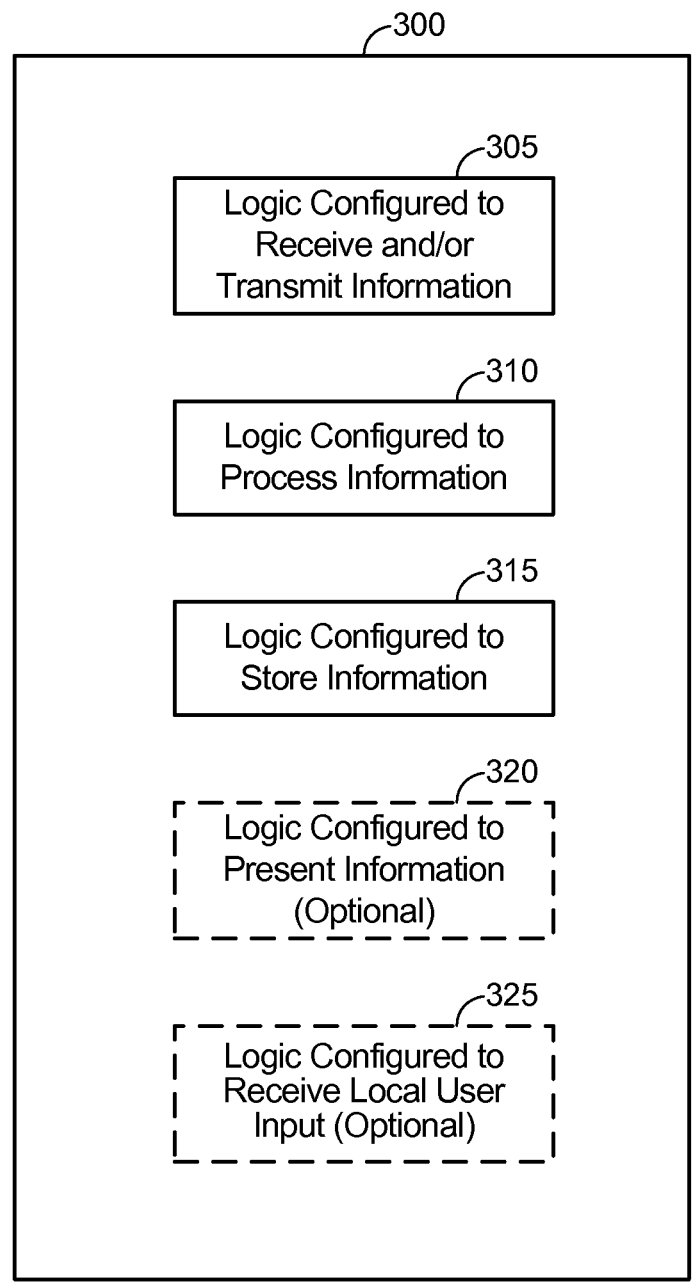
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. As an example, where the communication device 300 is configured to construct a grammar to describe interactions among a plurality of devices in a network, as described herein, the logic configured to receive and/or transmit information 305 may include logic configured to receive device capabilities of each of the plurality of devices. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, where the communication device 300 is configured to construct a grammar to describe interactions among a plurality of devices in a network, as described herein, the logic configured to process information 310 may include logic configured to generate a reduced device list representing groupings of the plurality of devices based on the device capabilities, logic configured to model one or more sequences of interactions among the plurality of devices using the reduced device list, and/or logic configured to construct the grammar based on the modeled one or more sequences of interactions. The processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, where the communication device 300 is configured to construct a grammar to describe interactions among a plurality of devices in a network, as described herein, the logic configured to store information 315 may include logic configured to store the grammar in a memory of the communication device 300. The non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

The various embodiments may be implemented on any of a variety of commercially available server devices or supervisor devices, such as IoT server 170 or supervisor device 130, respectively, in FIG. 1B. For simplicity, the functionality described herein is described as being performed by the IoT server 170, but it will be apparent that the supervisor device 130 may perform the functions described herein.

Figure 4A:
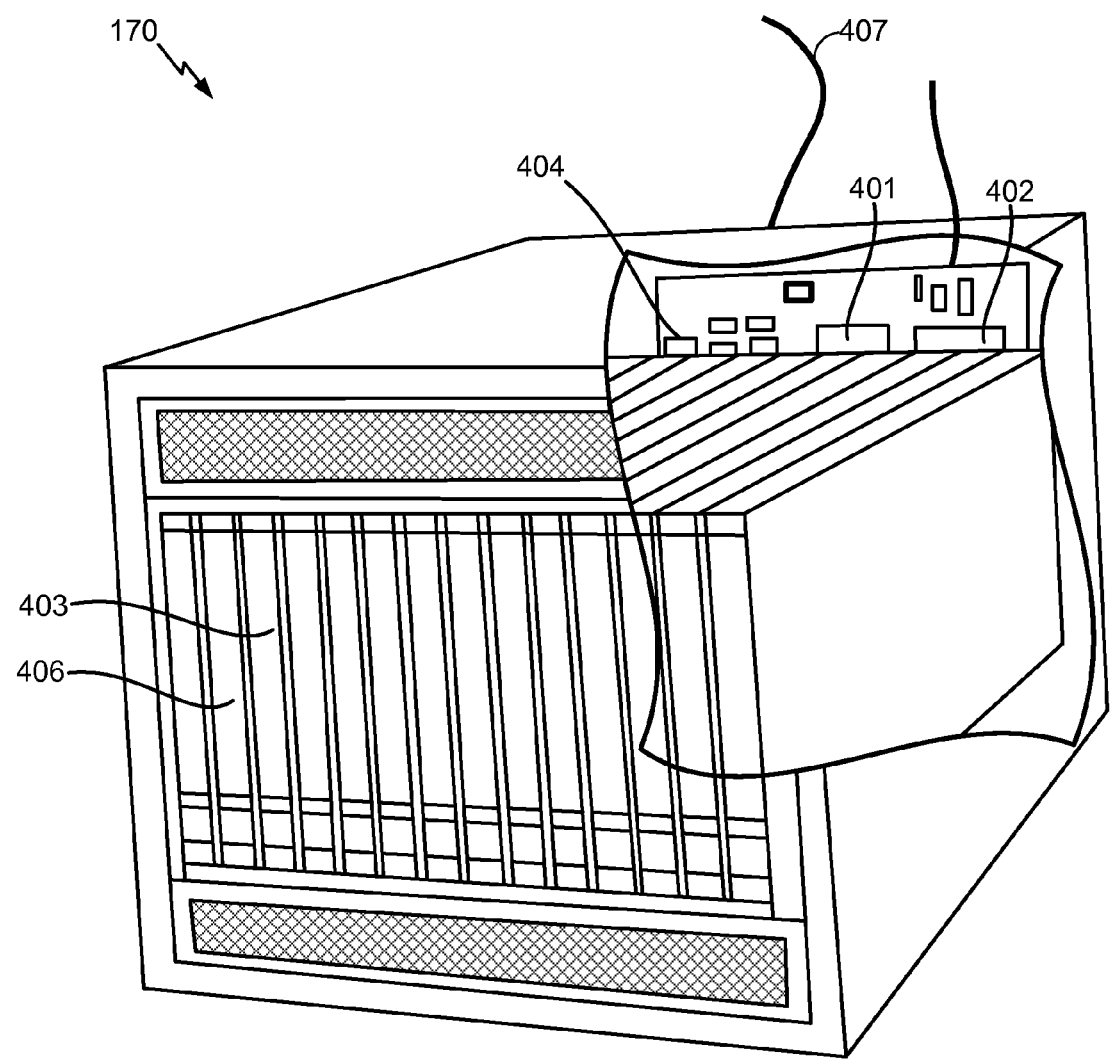
FIG. 4A illustrates an exemplary server according to various aspects of the disclosure.

FIG. 4A illustrates a simplified diagram of IoT server 170 according to an aspect of the disclosure. In FIG. 4A, the IoT server 170 includes a processor 401 coupled to volatile memory 402 and a large capacity nonvolatile memory, such as a disk drive 403. The IoT server 170 may also include a floppy disc drive, compact disc (CD) or digital video disc (DVD) disc drive 406 coupled to the processor 401. The IoT server 170 may also include network access ports 404 coupled to the processor 401 for establishing data connections with a network 407, such as a local area network coupled to other broadcast system computers and servers or to the Internet.

In context with FIG. 3, it will be appreciated that the IoT server 170 of FIG. 4 illustrates one example implementation of the communication device 300, whereby the logic configured to transmit and/or receive information 305 corresponds to the network access points 404 (which may be wired or wireless) used by the IoT server 170 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 4B:
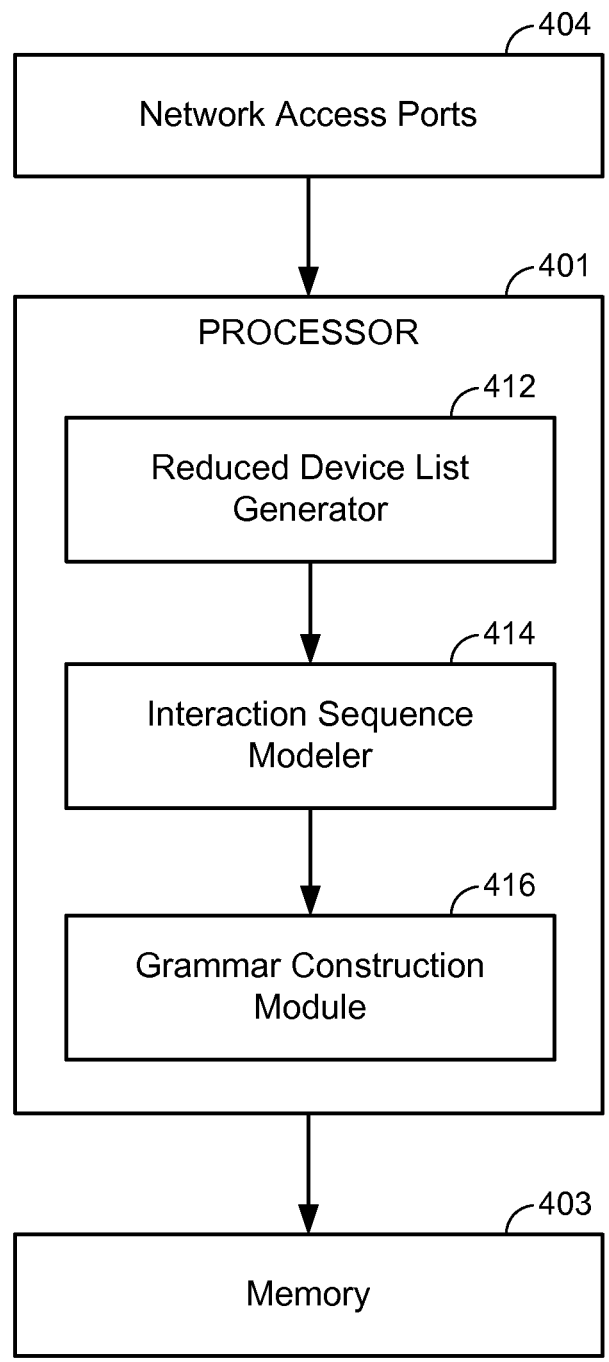
FIG. 4B illustrates an exemplary processor of the server illustrated in FIG. 4A according to various aspects of the disclosure.

FIG. 4B illustrates exemplary components of the processor 401 of IoT server 170 in FIG. 4A according to an embodiment of the disclosure. Specifically, the processor 401 includes a reduced device list generator 412 configured to generate a reduced device list representing groupings of a plurality of devices in an IoT network based on device capabilities received via the network access points 404, as described herein. The processor 401 also includes an interaction sequence modeler 414 configured to model one or more sequences of interactions among the plurality of devices using the reduced device list, as described herein. The processor 401 further includes a grammar construction module 416 configured to construct a grammar based on the modeled one or more sequences of interactions, as described herein. The grammar may then be stored in memory 403.

In an embodiment, the reduced device list generator 412 may generate the reduced device list based on device capabilities retrieved from memory 403, where memory 403 stored the device capabilities after the IoT server 170 received the device capabilities via the network access points 404. Similarly, rather than merely store the generated grammar in memory 403, the IoT server 170 can transmit the grammar to one or more other IoT devices or servers via network access ports 404.

"Devices" are becoming smaller and are embedded in many different products through the "Internet of Things." Networks of devices communicating with each other are therefore more dynamic and harder to identify. As the IoT evolves, and as devices work together in ways that are far more sophisticated and powerful than any single device could possibly act on its own, it would be beneficial to understand the meaning and implementation of the concept of "value." In evaluating data points in a conventional statistical system, it is difficult to discern, and thus mine, the real value of that data because it is largely detached from reference points that would put it in context, such as time and space. Thus, it is difficult to truly understand the value inherent in an IoT ecosystem and how to leverage devices accordingly. To this end, the question can be asked, what is the quantitative measure to know by how much the whole exceeds the sum of its parts?

When attempting to tap into the holistic aspect of the IoT, there is a question of how to capture added value. This requires the ability to measure the significance of a holistic system where the sum is greater than its individual parts. It also requires the ability to quantify and define "value" in a way that can be measured. This is particularly complicated because the value of IoT devices cannot be measured as A+B+C=D. Instead, because these devices are functioning together as a whole, they have some additional value.

For example, if five IoT devices are acting as speakers for a surround sound system, and a sixth IoT device is added, there is an added value by going from five to six devices that is greater than the value of each individual speaker. That is, the added value is the value of a surround sound system having six speakers versus a surround sound system having five speakers. In addition, when a single IoT device is functioning as a single speaker in a room and then a second IoT device is added, creating surround sound, the added value accrued to the system may be a different additional value than adding the sixth device to the five devices. That is, the value added by going from a single-speaker system to a dual-speaker system is different than the value added by going from a surround sound system having five speakers to a surround sound system having six speakers.

To quantify the value of each IoT device, the classic formula of A+B should give way to the new formula of A+delta. This raises the question of how to measure "delta." The proposed system creates a function that includes time and space as parameters to assign and quantify the delta. Bringing time-space parameters into play allows for a new way of quantifying value.

For example, given six mobile phones, each valued at $100, their combined value is a total of $600, as each device is evaluated independently, irrespective of its position in time or space. However, referring to the surround sound system example above, if the six mobile phones work together in an IoT network to create a surround-sound system, their combined value may be different than $600. Assuming a surround-sound system is valued at $1,000, the six mobile phones are now worth $1,000. Their combined value has increased by $400 by virtue of the time-space factor, as all devices must be present in the same time and space in order to provide surround sound.

Accordingly, the various aspects of the disclosure are related to quantifying the holistic value of an existing network of devices by measuring the complexity of a generated grammar. Initially, the capabilities of the devices in an IoT network are sent to the server for the IoT network, such as IoT server 170 or supervisor 130 in FIG. 1B. The IoT server 170, specifically the reduced device list generator 412, clusters the capabilities, reducing the number of devices into groups based on their capabilities. For example, each device in the IoT network can log various observations, such as the number of packets sent and received in a 60 second window and the time of transmission of each packet. The devices can send the observation log files to the IoT server 170. The IoT server 170, specifically the reduced device list generator 412, can construct a feature vector for observation in the observation logs, such as a three dimensional feature vector including time, number of packets sent, and number of packets received. The feature vectors can then be statistically clustered as is known in the art, assigning each feature vector to a centroid, and thereby grouping the devices into a reduced device list based on their capabilities.

Next, one or more "spy" devices can monitor interactions between devices in the IoT network and report the interactions to the IoT server 170. The spy device(s) may monitor interactions explicitly by, for example, packet sniffing in the network, or implicitly by, for example, inferring that a first device sent a packet to a second device. For example, if the first device sends a packet at a first time and the second device receives the packet at a second time, a spy device may infer that the first device sent the packet to the second device. Spy devices may be one or more of the interacting devices or any device that can detect and report the interactions.

Using the reduced device list, the IoT server 170, specifically the interaction sequence modeler 414, can model sequences of interactions. Interactions may manifest in the clustered space. The IoT server 170 can analyze the observations in the received observation logs in sequence, sorted by time. At each time step, the IoT server 170/interaction sequence modeler 414 can assign an observation to a centroid. The sequence of centroids associated with each observation is referred to as a "sequence of interactions."

The IoT server 170, specifically the grammar construction module 416, can then construct a "grammar" based on these sequences of interactions. The IoT server 170/grammar construction module 416 evaluates the reported interactions and generates grammars that characterize particular interaction sequences from the reported interactions. For example, a first grammar may comprise the sequence of interactions consisting of 1) Remote Control Signal detected from Remote Control Device, 2) TV signal indicating that the TV is turning on, and 3) Light Adjustment Signal indicating that lighting has been changed to TV mode based on detection of TV turning on.

To generate the reduced device list and model the sequences of interactions, the IoT server 170 can first generate a scattergram and then convert it to a state model. A scattergram depicts structured knowledge, while a state diagram depicts a narrative. As such, a state diagram captures more information. The relative value of different data sets can be compared in the narrative space.

Any set of data can be structured and mapped to a scattergram. The IoT server 170 clusters the data, finds the centroids, defines the axes, and maps the data. Any data that is mapped to clusters can then be mapped to a state machine, where each centroid is a state and each data point is a transition.

Figure 5A:
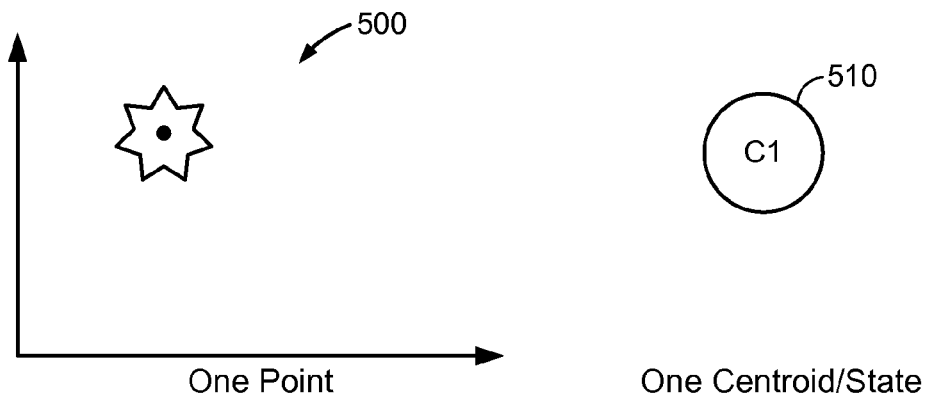
FIG. 5A-D illustrate an example of converting a scattergram to a state machine.
Figure 5B:
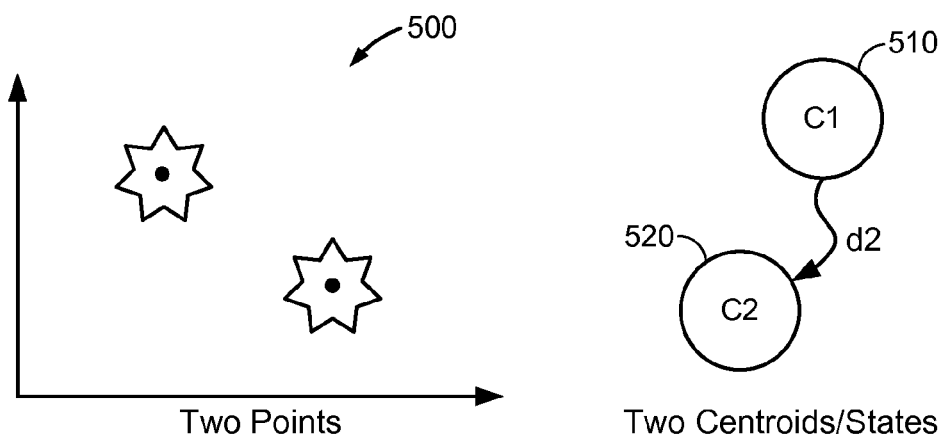

FIG. 5A-D illustrate an example of converting a scattergram to a state machine. In FIG. 5A, scattergram 500 includes one point, which corresponds to one centroid/state C1 510. In FIG. 5B, a second point has been added to scattergram 500. The second point is in a separate cluster with a second centroid/state C2 520. The second data point indicates a transition "d2" from centroid/state C1 510 to C2 520.

Figure 5C:
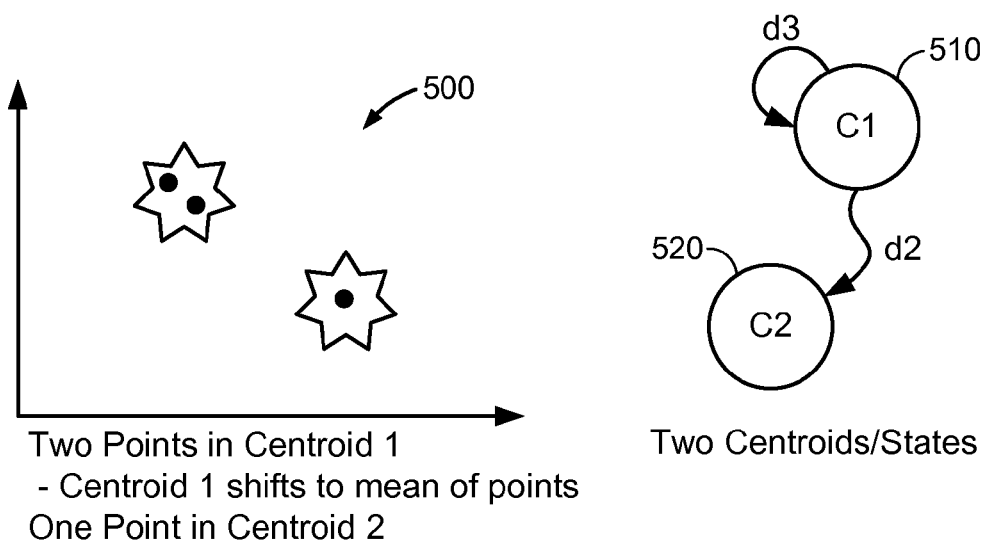

In FIG. 5C, a third point has been added to scattergram 500. Centroid/state C1 510 now includes two points, and is shifted to the mean of the two points. The third data point indicates a transition "d3" from centroid/state C1 510 back to centroid/state C1 510.

Figure 5D:
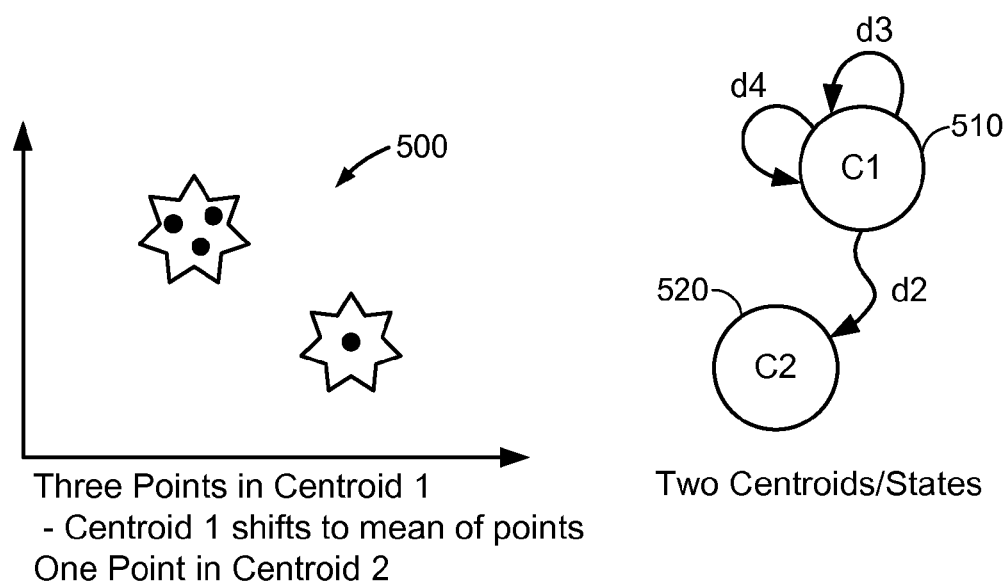

In FIG. 5D, a fourth point has been added to scattergram 500. Centroid/state C1 510 now includes three points, and is shifted to the mean of the three points. The fourth data point indicates a transition "d4" from centroid/state C1 510 back to centroid/state C1 510. The transition d4 reflects the distance between d4 and centroid/state C1 510.

Figure 6A:
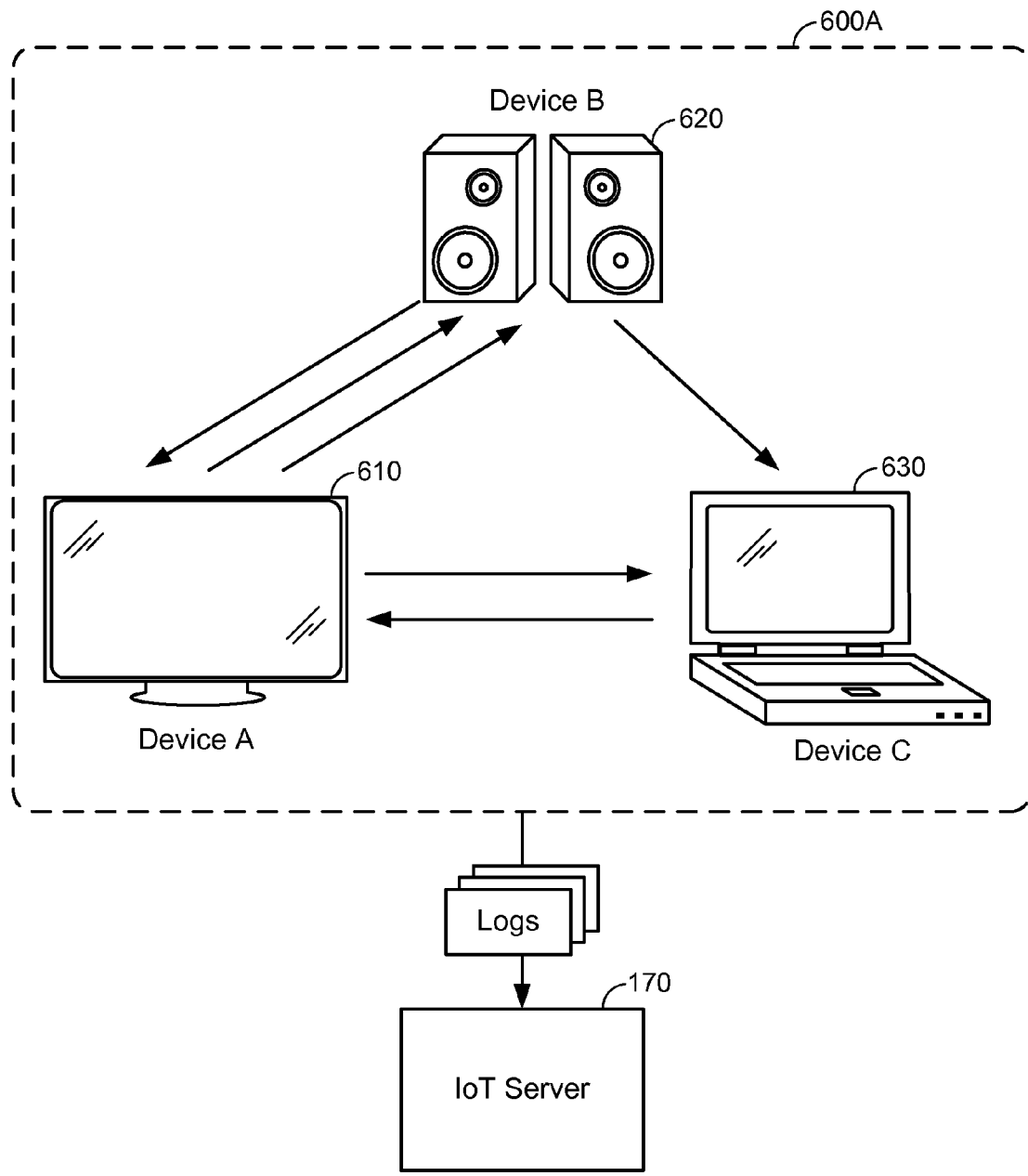
FIG. 6A illustrates an exemplary sequence of interactions between devices in a first IoT network that can be used to construct a grammar of interactions.

After generating the reduced device list and modeling the sequences of interactions, the IoT server 170, specifically the grammar construction module 416, constructs a grammar to describe the interactions among the devices in the IoT network. FIG. 6A illustrates an exemplary sequence of interactions between devices in an IoT network 600A that can be used to construct a grammar of interactions. In FIG. 6A, Device A 610, Device B 620, and Device C 630 form the exemplary IoT network 600A. The various arrows between devices 610-630 illustrate sequences of interactions between the devices. A spy device, which may be, but need not be, one of devices 610-630, detects and logs the various interactions between devices 610-630. The spy device sends the logged interactions to the IoT server, such as the IoT server 170 or the supervisor 130 in FIG. 1B.

In FIG. 6A, the sequence of interactions is [A] [B] [C] [A] [B] [A] [C] [A]. Using the well-known SEQUITUR algorithm, the following grammar may be constructed based on this sequence of interactions: S→1 2 3 2, where "1" indicates the interaction "AB," "2" indicates the interaction "CA," and "3" indicates the interaction "BA."

Figure 6B:
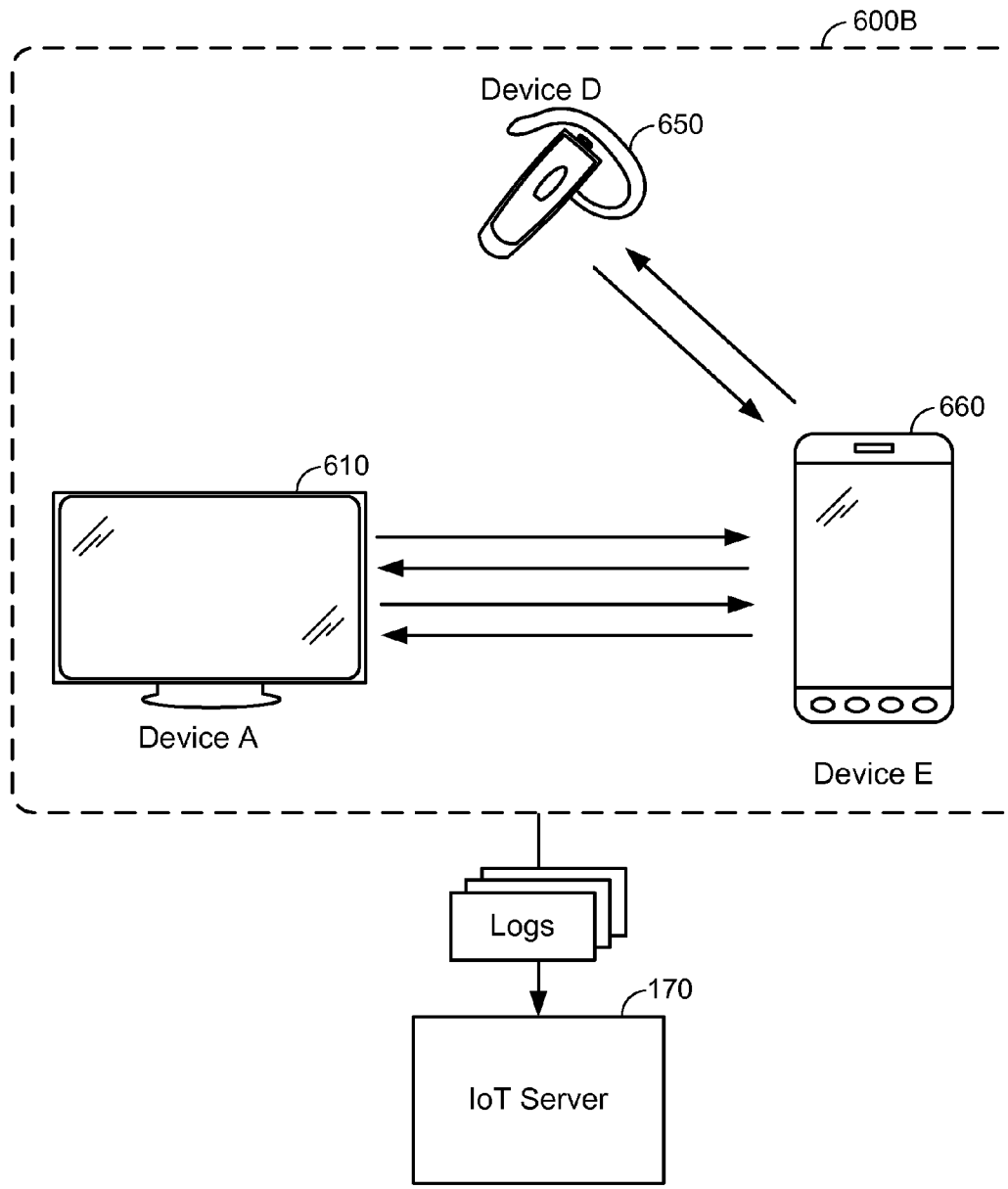
FIG. 6B illustrates an exemplary sequence of interactions between devices in a second IoT network that can be used to construct a grammar of interactions.

FIG. 6B illustrates an exemplary sequence of interactions between devices in an IoT network 600B that can be used to construct a grammar of interactions. In FIG. 6B, Device A 610, Device D 650, and Device E 660 form the exemplary IoT network 600B. The various arrows between devices 610, 650, 660 illustrate sequences of interactions between the devices. A spy device, which may be, but need not be, one of devices 610, 650, 660, detects and logs the various interactions between devices 610, 650, 660. The spy device sends the logged interactions to IoT server 170.

In FIG. 6B, the sequence of interaction is [A] [E] [D] [E] [A] [E] [D] [E]. Using the well-known SEQUITUR algorithm, the following grammar may be constructed based on this sequence of interactions: S→3 3, where "1" indicates the interaction "AE," "2" indicates the interaction "DE," and "3" indicates the interaction "1 2," i.e., "AEDE."

The IoT server 170 can then compare the constructed grammars to determine similarities or derive other information, as described below:

| [A] [B] [C] [A] | [A] [E] [D] [E] |
| [B] [A] [C] [A] | [A] [E] [D] [E] |
| --- | --- |
| S -> 1 2 3 2 | S -> 3 3 |
| 1 -> AB | 1 -> AE |
| 2 -> CA | 2 -> DE |
| 3 -> BA | 3 -> 1 2 |

Figure 7:
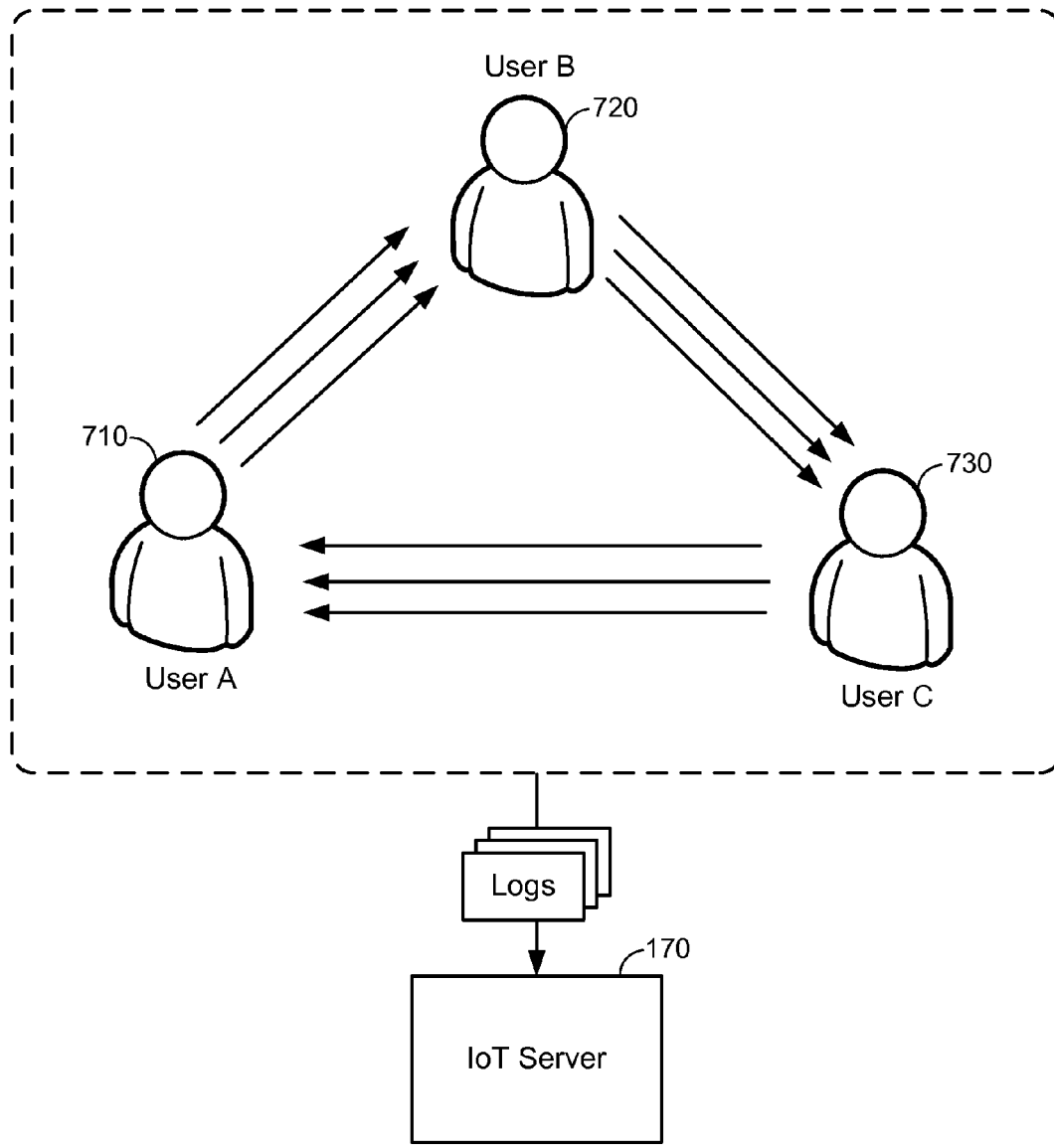
FIG. 7 illustrates an exemplary sequence of proximity detections between a first user, a second user, and a third user.

The above-described techniques can also be used to determine relationships between users based on their proximity to each other. FIG. 7 illustrates an exemplary sequence of proximity detections between User A 710, User B 720, and User C 730. The proximity detections may be determined by the users' IoT devices, such as the users' smartphones. In FIG. 7, the various arrows between users 710-730 illustrate the users coming into proximity with each other. A spy device, which may be, but need not be, one of the IoT devices belonging to users 710-730, detects and logs the various proximity detections between users 710-730. The spy device sends the logged proximity detections to an IoT server, such as the IoT server 170 or the supervisor 130 in FIG. 1B.

In FIG. 7, the sequence of proximity detections is [A] [B] [C] [A] [B] [C] [A] [B] [C] [A]. The following grammar may be constructed based on this sequence of proximity detections: S→1 2 3 1 2, where "1" indicates the interaction "AB," "2" indicates the interaction "CA," and "3" indicates the interaction "BC."

After generating the reduced device list, modeling the sequences of interactions, and constructing the grammar, the IoT server 170 can then define one or more actions to occur in the IoT network in response to detecting the constructed grammar. The IoT server 170 may determine the one or more actions to perform through prior knowledge, expert system analysis, and/or previous examples from other IoT networks. Referring to the example above of detecting that a TV is turning on (2) and that the lighting has been changed to TV mode (3), the action triggered by the first grammar may be to 4) turn on rear speakers whenever Grammar #1+#2+#3 is detected. The grammar may be detected by the IoT server 170 or the spy device. The IoT server 170 may instruct the appropriate device(s) to initiating the one or more defined actions (e.g., action #4) in response to detecting the constructed grammar (e.g., action #1+#2+#3).

The IoT server 170 can compare the grammars of different interactions to each other to derive the value of different networks of IoT devices. A number of techniques are possible to quantify a grammar and facilitate grammar comparison, such as the depth of the grammar or the complexity of the grammar (e.g., context free grammars versus context grammars). For example, a metric for the SEQUITUR algorithm could be defined, such as how many numbers versus how many letters are in the grammar. Two grammars can then be compared using the result.

Optionally, once the IoT server 170 constructs the various grammars, it can send the set of grammars to the spy device. In that case, the spy device can report grammar detection instead of interaction detections to the IoT server 170.

Figure 8:
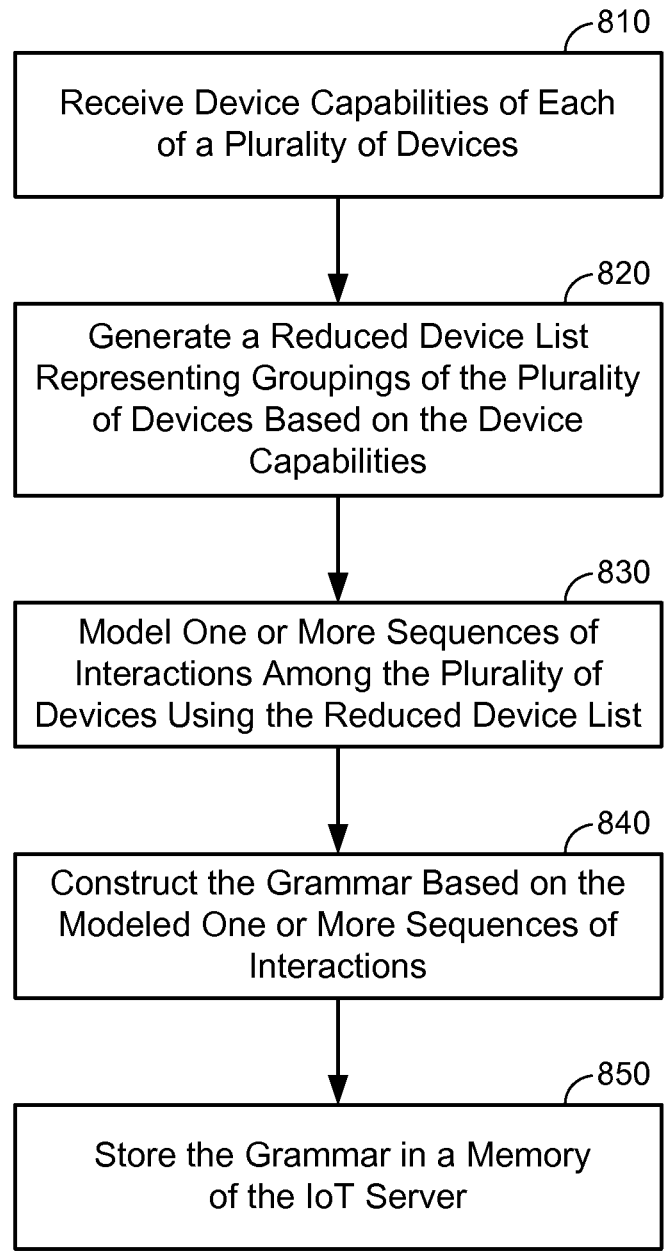
FIG. 8 illustrates an exemplary flowchart for constructing a grammar to describe interactions among a plurality of devices in a network.

FIG. 8 illustrates an exemplary flowchart for constructing a grammar to describe interactions among a plurality of devices in a network. The flow illustrated in FIG. 8 may be performed by the IoT server 170 (or the supervisor 130 in FIG. 1B).

At 810, the IoT server 170, specifically the network access ports 404, receives device capabilities of each of the plurality of devices in the network. The IoT server 170 may also receive one or more observation logs including information about one or more interactions among a subset of the plurality of devices.

At 820, the IoT server 170, specifically the reduced device list generator 412, generates a reduced device list representing groupings of the plurality of devices based on the device capabilities. Generating the reduced device list may include clustering the device capabilities to generate the reduced device list. Clustering the device capabilities may include generating one or more feature vectors representing the received one or more observation logs and clustering the one or more feature vectors to generate the reduced device list.

At 830, the IoT server 170, specifically the interaction sequence modeler 414, models one or more sequences of interactions among the plurality of devices using the reduced device list. At some point during or after the flow illustrated in FIG. 8, the IoT server 170 may receive a log of one or more interactions among a subset of the plurality of devices. The IoT server 170 may receive the log from a device of the plurality of devices that is not involved in the one or more interactions, i.e., a "spy" device. In this case, modeling at 830 may include assigning a sequence of the one or more interactions to a sequence of one or more centroids to model the sequence of one or more interactions.

At 840, the IoT server 170, specifically the grammar construction module 416, constructs the grammar based on the modeled one or more sequences of interactions. At 850, the IoT server 170 stores the grammar in a memory of the IoT server 170, such as memory 403.

Figure 9:
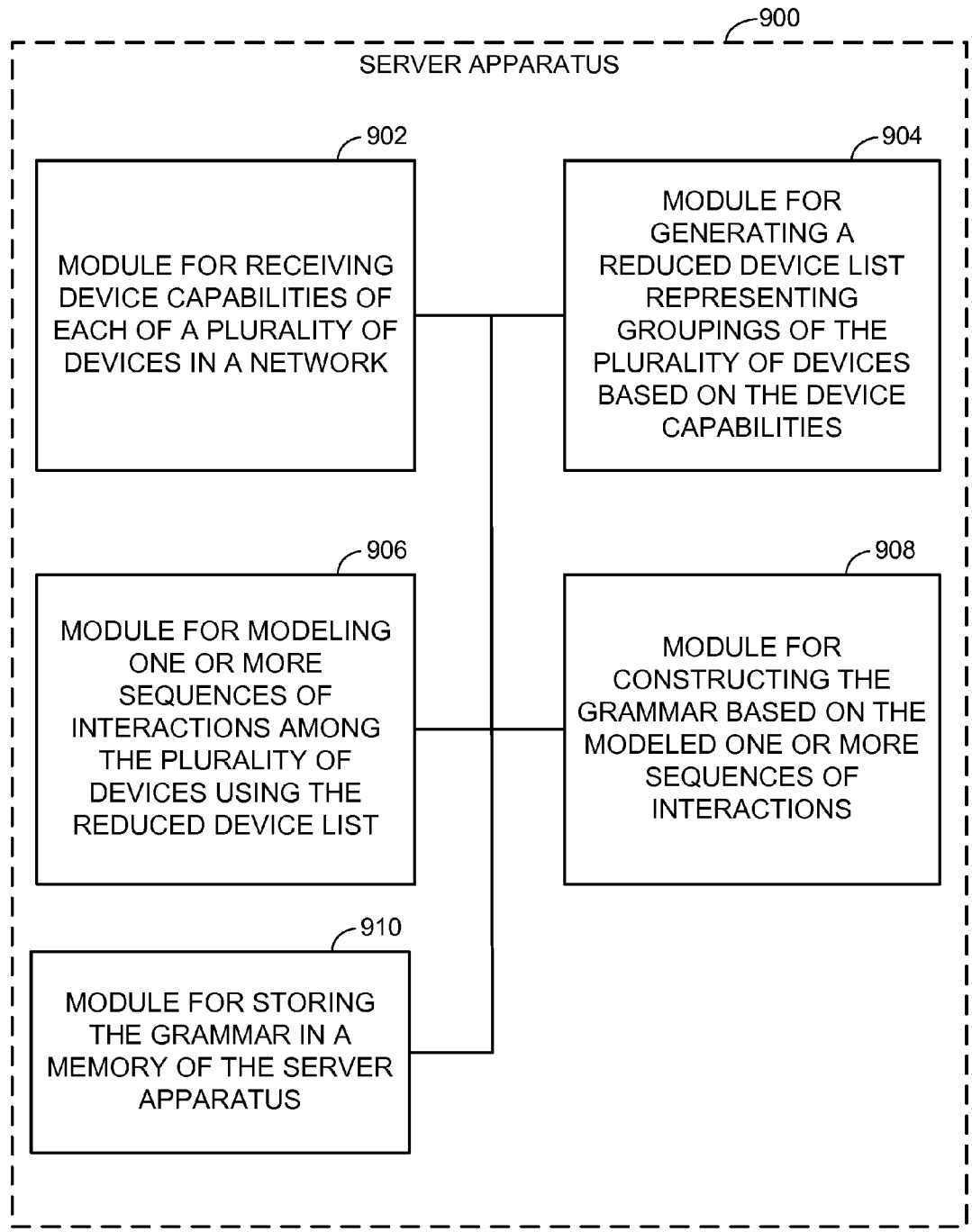
FIG. 9 is a simplified block diagram of several sample aspects of an apparatus configured to support communication as taught herein.

FIG. 9 illustrates an example server apparatus 900 represented as a series of interrelated functional modules. A module for receiving 902 may correspond at least in some aspects to, for example, a communication device, such as network access ports 404 in FIG. 4B, as discussed herein. A module for generating 904 may correspond at least in some aspects to, for example, a processing system, such as processor 401 in conjunction with the reduced device list generator 412 in FIG. 4B, as discussed herein. A module for modeling 906 may correspond at least in some aspects to, for example, a processing system, such as processor 401 in conjunction with the interaction sequence modeler 414 in FIG. 4B, as discussed herein. A module for constructing 908 may correspond at least in some aspects to, for example, a processing system, such as processor 401 in conjunction with the grammar construction module 416 in FIG. 4B, as discussed herein. A module for storing 910 may correspond at least in some aspects to, for example, a memory, such as memory 403 in FIG. 4B, as discussed herein.

The functionality of the modules of FIG. 9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 9, as well as other components and functions described herein, may be implemented using any suitable means. Such means also may be implemented, at least in part, using corresponding structure as taught herein. For example, the components described above in conjunction with the "module for" components of FIG. 9 also may correspond to similarly designated "means for" functionality. Thus, in some aspects one or more of such means may be implemented using one or more of processor components, integrated circuits, or other suitable structure as taught herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for constructing a grammar to describe interactions among a plurality of devices in a network, comprising:
   receiving, by a network interface of a device, device capabilities of each of the plurality of devices;
   generating, by a reduced device list generator of the device, a reduced device list representing groupings of the plurality of devices based on clustering the device capabilities, wherein a grouping of the plurality of devices comprises more than one device of the plurality of devices;
   modeling, by an interaction sequence modeler of the device, one or more sequences of interactions among the plurality of devices based on assigning one or more interactions among a subset of the plurality of devices to one or more clusters of the plurality of clusters corresponding to the groupings of the plurality of devices represented by the reduced device list;
   constructing, by a grammar construction module of the device, the grammar based on the modeled one or more sequences of interactions; and
   storing the grammar in a memory of the device.

2. The method of claim 1, wherein the reduced device list generator performs the clustering of the device capabilities to generate the reduced list.

3. The method of claim 1, further comprising:
receiving one or more observation logs, the one or more observation logs including information about one or more interactions among the subset of the plurality of devices.

4. The method of claim 3, wherein the clustering comprises:
generating one or more feature vectors representing the received one or more observation logs; and
clustering the one or more feature vectors to generate the reduced device list.

5. The method of claim 1, further comprising:
receiving a log of the one or more interactions among the subset of the plurality of devices.

6. The method of claim 5, wherein the log is received from a device of the plurality of devices that is not involved in the one or more interactions.

7. The method of claim 5, wherein the modeling the one or more sequences of interactions comprises:
assigning a sequence of the one or more interactions to a sequence of one or more centroids of the plurality of clusters to model the one or more sequences of interactions.

8. The method of claim 1, wherein the device comprises an Internet of Things (IoT) server.

9. The method of claim 1, wherein the device comprises a supervisor device in the network other than an IoT server.

10. The method of claim 1, wherein the plurality of devices comprises a plurality of IoT devices.

11. An apparatus for constructing a grammar to describe interactions among a plurality of devices in a network, comprising:
a network interface configured to receive device capabilities of each of the plurality of devices;
a reduced device list generator configured to generate a reduced device list representing groupings of the plurality of devices based on the device capabilities being clustered, wherein a grouping of the plurality of devices comprises more than one device of the plurality of devices;
an interaction sequence modeler configured to model one or more sequences of interactions among the plurality of devices based on one or more interactions among a subset of the plurality of devices being assigned to one or more clusters of the plurality of clusters corresponding to the groupings of the plurality of devices represented by the reduced device list;
a grammar construction module configured to construct the grammar based on the modeled one or more sequences of interactions; and
a memory configured to store the grammar.

12. The apparatus of claim 11, wherein the reduced device list generator is further configured to cluster the device capabilities to generate the reduced list.

13. The apparatus of claim 11, wherein the network interface is further configured to receive one or more observation logs, the one or more observation logs including information about the one or more interactions among the subset of the plurality of devices.

14. The apparatus of claim 13, wherein the reduced device list generator being configured to cluster the device capabilities comprises the reduced device list generator being configured to:
generate one or more feature vectors representing the received one or more observation logs; and
cluster the one or more feature vectors to generate the reduced device list.

15. The apparatus of claim 11, wherein the network interface is further configured to receive a log of one or more interactions among the subset of the plurality of devices.

16. The apparatus of claim 15, wherein the log is received from a device of the plurality of devices that is not involved in the one or more interactions.

17. The apparatus of claim 15, wherein the interaction sequence modeler being configured to model one or more sequences of interactions comprises the interaction sequence modeler being configured to assign a sequence of the one or more interactions to a sequence of one or more centroids of the plurality of clusters to model the one or more sequences of interactions.

18. The apparatus of claim 11, wherein the apparatus comprises an Internet of Things (IoT) server.

19. The apparatus of claim 11, wherein the apparatus comprises a supervisor device in the network other than an IoT server.

20. The apparatus of claim 11, wherein the plurality of devices comprises a plurality of IoT devices.

21. An apparatus for constructing a grammar to describe interactions among a plurality of devices in a network, comprising:
means for receiving, by a network interface of a device, device capabilities of each of the plurality of devices;
means for generating, by a reduced device list generator of the device, a reduced device list representing groupings of the plurality of devices based on the device capabilities being clustered, wherein a grouping of the plurality of devices comprises more than one device of the plurality of devices;
means for modeling, by an interaction sequence modeler of the device, one or more sequences of interactions among the plurality of devices based on one or more interactions among a subset of the plurality of devices being assigned to one or more clusters of the plurality of clusters corresponding to the groupings of the plurality of devices represented by the reduced device list;
means for constructing, by a grammar construction module of the device, the grammar based on the modeled one or more sequences of interactions; and
means for storing the grammar in a memory of the apparatus.

22. The apparatus of claim 21, wherein the means for generating the reduced device list clusters the device capabilities to generate the reduced list.

23. The apparatus of claim 21, further comprising:
means for receiving one or more observation logs, the one or more observation logs including information about one or more interactions among the subset of the plurality of devices.

24. The apparatus of claim 23, wherein the means for clustering comprises:
means for generating one or more feature vectors representing the received one or more observation logs; and
means for clustering the one or more feature vectors to generate the reduced device list.

25. A non-transitory computer-readable medium for constructing a grammar to describe interactions among a plurality of devices in a network, comprising:
at least one instruction to receive, by a network interface of a device, device capabilities of each of the plurality of devices;
at least one instruction to generate, by a reduced device list generator of the device, a reduced device list representing groupings of the plurality of devices based on the device capabilities being clustered, wherein a grouping of the plurality of devices comprises more than one device of the plurality of devices;

at least one instruction to model, by an interaction sequence modeler of the device, one or more sequences of interactions among the plurality of devices based on one or more interactions among a subset of the plurality of devices being assigned to one or more clusters of the plurality of clusters corresponding to the groupings of the plurality of devices represented by the reduced device list;

at least one instruction to construct, by a grammar construction module of the device, the grammar based on the modeled one or more sequences of interactions; and at least one instruction to store the grammar in a memory of the device.

26. The non-transitory computer-readable medium of claim 25, wherein the reduced device list generator clusters the device capabilities to generate the reduced list.

27. The non-transitory computer-readable medium of claim 25, further comprising:

at least one instruction to receive one or more observation logs, the one or more observation logs including information about one or more interactions among the subset of the plurality of devices.

28. The non-transitory computer-readable medium of claim 27, wherein the at least one instruction to cluster comprises:

at least one instruction to generate one or more feature vectors representing the received one or more observation logs; and at least one instruction to cluster the one or more feature vectors to generate the reduced device list.

29. The non-transitory computer-readable medium of claim 25, further comprising:

at least one instruction to receive a log of one or more interactions among the subset of the plurality of devices.

30. The non-transitory computer-readable medium of claim 29, wherein the at least one instruction to model the one or more sequences of interactions comprises:

at least one instruction to assign a sequence of the one or more interactions to a sequence of one or more centroids of the plurality of clusters to model the one or more sequences of interactions.

* * * * *